United States Patent Office 3,056,270
Patented Oct. 2, 1962

3,056,270
PROCESS FOR PREPARATION OF PURE
CHLORINE DIOXIDE
Heribert Grubitsch, Graz, Austria, assignor to FMC
Corporation, a corporation of Delaware
No Drawing. Filed Dec. 16, 1960, Ser. No. 76,114
4 Claims. (Cl. 62—48)

The invention relates to the preparation of pure, stable chlorine dioxide.

Chlorine dioxide is a gas at room temperature. As a result of its high heat of formation of 21.7 kilogram calories/mol, it tends to decompose spontaneously with explosion at higher concentrations into its components and into lower chlorine-oxygen compounds. This decomposition process is catalyzed by the presence of organic material, by irradiation of energy-rich light and by the presence of elementary bromine and lower chlorine oxides such as $Cl_2O$. According to their materials of construction, the vessel walls can also catalyze the decomposition of the chlorine dioxide.

Since chlorine dioxide has found a broad industrial application for bleaching, sterilizing, deodorizing and combating pests, it is prescribed for avoiding explosions that the partial pressure of the chlorine dioxide in the mixes used in practice should not exceed 30–70 Torricelli.

It is not possible to remove completely the impurities which catalyze decomposition of the chlorine dioxide, even by known industrial purification processes. Such processes include treatment with oxides, hydroxides, magnesium carbonates, alkali carbonates and alkaline earth metals, with calcium hydroxide, contact with sulfur, selective absorption of chlorine in water, treatment with aqueous sulfuric acid, with solutions of sodium chloride and chlorate, with solutions of chlorides and chlorates, or with calcium and magnesium, or reduction of chlorine in aqueous solution with sulfur dioxide. Purification of chlorine dioxide with silver nitrate or sodium arsenite provides a substantially more stable product, but one which still tends to spontaneous decomposition and explosion.

It has now been found that a pure, exceedingly stable, chlorine dioxide, which shows no decomposition phenomena even on heating to 70° C., can be obtained by mixing chlorine dioxide, purified according to the method of Luther and Hofmann (Zeitschrift Phys. Chem. Bodenstein Festb., 1931, 755) with silver nitrate or sodium arsenite, with pure carbon dioxide and condensing the gas mixture by cooling and allowing the carbon dioxide to boil out of the mixture at temperatures between 0° and 50° C., preferably between 20° and 30° C. The treatment with silver nitrate or sodium arsenite removes essentially all chlorine and bromine from the chlorine dioxide, thus rendering it especially suitable for the herein purification with carbon dioxide. Pure stable chlorine dioxide can be obtained by this procedure from mixtures of 95–10 volume percent of chlorine dioxide and 5–90 volume percent of carbon dioxide in the liquid residue or in the end fraction of the boiling gas. In preferred practice of the present process, solutions of 30–60 volume percent of chlorine dioxide and 70–40 volume percent of carbon dioxide are employed. In a particularly preferred practice, the boiling carbon dioxide containing chlorine dioxide derived from the process is recycled and used in further mixtures. However, it can also be made useable for purposes in which a high content in chlorine dioxide is not arrived at and/or the carbon dioxide is not disturbed.

The pure chlorine dioxide obtained by this process may be stored, for example, in silver plated vessels coated with a fused layer of silver chloride. Fused iron vessels electrolytically silver plated inside and then fused with silver chloride are advantageously used for liquefaction and further conduction of gases. The silver chloride adheres excellently to the electrolytic silver plating and forms a cohesive, enamel-like coating, which is particularly suited to storage of chlorine dioxide, being resistant to formation of degradative influences.

What is claimed is:

1. Process for the preparation of stabilized, pure chlorine dioxide, comprising mixing chlorine dioxide gas with carbon dioxide gas, cooling the gas mixture to condense it, and thereafter boiling the carbon dioxide out of the condensate at temperatures of about 0° to 50° C.

2. Process of claim 1 in which the temperature at which the carbon dioxide is boiled is about 20° to 30° C.

3. Process of claim 1 in which the condensed gas mixture is adjusted by removal of carbon dioxide to a content of between about 30 and 60 volume percent chlorine dioxide.

4. Process of claim 3 in which carbon dioxide gas containing chlorine dioxide gas in admixture and distilled from the condensates, is recycled and used in further treatment of chlorine dioxide.

References Cited in the file of this patent
UNITED STATES PATENTS

| | | |
|---|---|---|
| 2,768,877 | Williamson et al. | Oct. 30, 1956 |
| 2,876,077 | Haller | Mar. 3, 1959 |
| 2,928,529 | Grosse et al. | Mar. 15, 1960 |